United States Patent
Kolokotronis (10) Patent No.: US 10,490,890 B2
(45) Date of Patent: Nov. 26, 2019

(54) DYNAMIC ANTENNA AZIMUTH ADJUSTMENT

(71) Applicant: FASMETRICS S.A., Athens (GR)

(72) Inventor: Dimitris Kolokotronis, Athens (GR)

(73) Assignee: Fasmetrics S.A., Athens (GR)

( * ) Notice: Subject to any disclaimer, the term of this patent is extended or adjusted under 35 U.S.C. 154(b) by 310 days.

(21) Appl. No.: 15/315,923

(22) PCT Filed: Jun. 3, 2015

(86) PCT No.: PCT/EP2015/062303
§ 371 (c)(1),
(2) Date: Dec. 2, 2016

(87) PCT Pub. No.: WO2015/197324
PCT Pub. Date: Dec. 30, 2015

(65) Prior Publication Data
US 2017/0093033 A1    Mar. 30, 2017

(30) Foreign Application Priority Data

Jun. 4, 2014 (GB) .................................. 1409889.1

(51) Int. Cl.
*H01Q 3/04* (2006.01)
*H01Q 21/00* (2006.01)
(Continued)

(52) U.S. Cl.
CPC .............. *H01Q 3/04* (2013.01); *H01Q 21/00* (2013.01); *H04W 16/28* (2013.01); *H01Q 3/005* (2013.01); *H01Q 3/08* (2013.01); *H04W 24/02* (2013.01)

(58) Field of Classification Search
CPC ............ H01Q 3/04; H01Q 3/08; H01Q 3/005; H01Q 21/00; H04W 16/28; H04W 24/02
(Continued)

(56) References Cited

U.S. PATENT DOCUMENTS

| | | | | |
|---|---|---|---|---|
| 5,603,089 A | * | 2/1997 | Searle ................... | H01Q 3/242 455/507 |
| 5,861,844 A | * | 1/1999 | Gilmore .................. | H01Q 3/24 342/374 |

(Continued)

FOREIGN PATENT DOCUMENTS

EP    2334113    6/2011

OTHER PUBLICATIONS

Search Report and Written Opinion issued in App. No. PCT/EP2015/062303 (2015).

*Primary Examiner* — Chuong P Nguyen
(74) *Attorney, Agent, or Firm* — Reichel Stohry Dean LLP; Natalie J. Dean (57) ABSTRACT

A method of determining the optimum radio planning parameter of an antenna azimuth heading, comprising receiving, by a control system, a first set of data indicative of network performance for mobile devices of users within a specified geographical area covered by an antenna sector having a first azimuth heading; determining, by the control system, a first set of average values of parameters indicative of network performance based on the first set of data; receiving, by the control system, a second set of data indicative of network performance for mobile users within the specified geographical covered by an antenna having a second azimuth heading, wherein the second azimuth heading is different from the first azimuth heading, determining, by the control system, a second set of average values of parameters indicative of network performance for the antenna sector having the second azimuth value based on the second set of data; comparing the first and second sets of average values of parameters indicative of network performance at the first and second azimuth headings for the (Continued)

antenna sector to determine the azimuth heading at which the network performance is optimized.

23 Claims, 8 Drawing Sheets (51) Int. Cl.
  *H04W 16/28* (2009.01)
  *H01Q 3/00* (2006.01)
  *H01Q 3/08* (2006.01)
  *H04W 24/02* (2009.01)

(58) Field of Classification Search
  USPC .............................................. 342/359, 372
  See application file for complete search history.

(56) References Cited

U.S. PATENT DOCUMENTS

| | | | |
|---|---|---|---|
| 6,456,652 B1* | 9/2002 | Kim | H04W 24/06 370/335 |
| 6,556,830 B1* | 4/2003 | Lenzo | H04W 16/02 370/281 |
| 7,146,170 B2* | 12/2006 | Davidson | H01Q 1/246 455/446 |
| 7,962,145 B2* | 6/2011 | Gale | H01Q 1/246 370/342 |
| 8,116,822 B1* | 2/2012 | Lo | H01Q 1/246 455/562.1 |
| 9,100,906 B1* | 8/2015 | Gauba | H04W 48/20 |
| 9,287,940 B2* | 3/2016 | Lee | H04B 7/024 |
| 9,728,849 B2* | 8/2017 | Kolokotronis | H01Q 1/246 |
| 10,098,013 B2* | 10/2018 | Kolokotronis | H04B 7/1555 |
| 10,263,329 B1* | 4/2019 | Powers | H01Q 3/26 |
| 2006/0084474 A1* | 4/2006 | Iacono | H04W 16/28 455/562.1 |
| 2009/0305638 A1* | 12/2009 | Calochira | H04W 16/18 455/67.11 |
| 2013/0116011 A1* | 5/2013 | Lee | H04W 16/28 455/562.1 |

* cited by examiner

| DAY | START TIME | END TIME | Samples, 305° | Samples, 320° | Samples, 335° | SUM OF SAMPLES | RSCP, 305° | RSCP, 320° | RSCP, 335° | AVG RSCP | MAX SAMPLES OFFSET | MAX SAMPLES vs WO SAMPLES |
|---|---|---|---|---|---|---|---|---|---|---|---|---|
| Day 1 | 0:00 | 0:45 | 57 | 84 | 104 | 245 | -86,428 | -85,725 | -77,549 | -83.233977 | 15 | 23.81 % |
| Day 1 | 0:45 | 1:30 | 56 | 72 | 88 | 216 | -80,128 | -80,134 | -85,569 | -81.943622 | 15 | 22.22 % |
| Day 1 | 1:30 | 2:15 | 53 | 55 | 85 | 193 | -74,354 | -84,536 | -80,791 | -79.893548 | 15 | 54.55 % |
| Day 1 | 2:15 | 3:00 | 63 | 55 | 76 | 194 | -84,649 | -79,606 | -82,285 | -82.179873 | 15 | 38.18 % |
| Day 1 | 3:00 | 3:45 | 52 | 53 | 70 | 175 | -86,510 | -79,550 | -82,527 | -82.862059 | 15 | 32.08 % |
| Day 1 | 3:45 | 4:30 | 41 | 55 | 71 | 167 | -88,469 | -86,182 | -83,894 | -86.181666 | 15 | 29.09 % |
| Day 1 | 4:30 | 5:15 | 57 | 43 | 77 | 177 | -83,709 | -82,651 | -84,796 | -83.718578 | 15 | 79.07 % |
| Day 1 | 5:15 | 6:00 | 52 | 64 | 73 | 189 | -84,569 | -80,295 | -80,428 | -81.763864 | 15 | 14.06 % |
| Day 1 | 6:00 | 6:45 | 49 | 55 | 65 | 169 | -75,459 | -74,274 | -79,647 | -76.459738 | 15 | 18.18 % |
| Day 1 | 6:45 | 7:30 | 47 | 50 | 75 | 172 | -87,723 | -82,520 | -78,665 | -82.969508 | 15 | 50.00 % |
| Day 1 | 7:30 | 8:15 | 50 | 49 | 93 | 192 | -83,034 | -78,595 | -79,445 | -80.35793 | 15 | 89.80 % |
| Day 1 | 8:15 | 9:00 | 59 | 63 | 93 | 215 | -71,906 | -75,688 | -82,087 | -76.560334 | 15 | 47.62 % |
| Day 1 | 9:00 | 9:45 | 80 | 101 | 144 | 325 | -72,174 | -76,455 | -73,814 | -74.147835 | 15 | 42.57 % |
| Day 1 | 9:45 | 10:30 | 105 | 144 | 168 | 417 | -79,468 | -70,692 | -74,258 | -74.805947 | 15 | 16.67 % |
| Day 1 | 10:30 | 11:15 | 104 | 120 | 184 | 408 | -80,763 | -77,903 | -70,404 | -76.356275 | 15 | 53.33 % |
| Day 1 | 11:15 | 12:00 | 133 | 114 | 198 | 445 | -76,659 | -75,087 | -70,717 | -74.154448 | 15 | 73.68 % |
| Day 1 | 12:00 | 12:45 | 123 | 165 | 147 | 435 | -72,696 | -78,434 | -73,701 | -74.943771 | 0 | 0.00 % |
| Day 1 | 12:45 | 13:30 | 144 | 156 | 173 | 473 | -74,606 | -77,658 | -72,128 | -74.797368 | 15 | 10.90 % |
| Day 1 | 13:30 | 14:15 | 118 | 182 | 131 | 431 | -76,817 | -72,504 | -72,504 | -73.941304 | 0 | 0.00 % |
| Day 1 | 14:15 | 15:00 | 100 | 129 | 186 | 415 | -79,676 | -74,897 | -73,842 | -76.138246 | 15 | 44.19 % |
| Day 1 | 15:00 | 15:45 | 104 | 124 | 112 | 340 | -83,654 | -82,872 | -83,638 | -83.388133 | 0 | 0.00 % |
| Day 1 | 15:45 | 16:30 | 103 | 135 | 179 | 417 | -76,877 | -79,120 | -70,292 | -75.429852 | 15 | 32.59 % |
| Day 1 | 16:30 | 17:15 | 115 | 113 | 152 | 380 | -69,224 | -70,429 | -71,986 | -70.546234 | 15 | 34.51 % |
| Day 1 | 17:15 | 18:00 | 116 | 136 | 173 | 425 | -83,744 | -71,654 | -80,819 | -78.739054 | 15 | 27.21 % |
| Day 1 | 18:00 | 18:45 | 108 | 122 | 148 | 378 | -70,245 | -82,513 | -78,869 | -77.209258 | 15 | 21.31 % |
| Day 1 | 18:45 | 19:30 | 103 | 92 | 157 | 352 | -80,457 | -82,915 | -82,775 | -82.048888 | 15 | 70.65 % |
| Day 1 | 19:30 | 20:15 | 103 | 138 | 152 | 393 | -80,815 | -82,352 | -79,874 | -81.013554 | 15 | 10.14 % |
| Day 1 | 20:15 | 21:00 | 71 | 150 | 155 | 376 | -80,414 | -77,182 | -80,740 | -79.445589 | 15 | 3.33 % |
| Day 1 | 21:00 | 21:45 | 102 | 119 | 115 | 336 | -79,880 | -78,134 | -80,158 | -79.39061 | 0 | 0.00 % |
| Day 1 | 21:45 | 22:30 | 97 | 105 | 119 | 321 | -75,124 | -79,874 | -85,019 | -80.005554 | 15 | 13.33 % |
| Day 1 | 22:30 | 23:15 | 96 | 128 | 122 | 346 | -79,434 | -77,790 | -78,352 | -78.525675 | 0 | 0.00 % |
| Day 1 | 23:15 | 0:00 | 59 | 101 | 113 | 273 | -78,054 | -79,953 | -82,761 | -80.256089 | 15 | 11.88 % |
| | | | | | | | | | | | | 30.16 % |

DYNAMIC ANTENNA AZIMUTH ADJUSTMENT

CROSS REFERENCE TO RELATED APPLICATIONS

This application is a U.S. nationalization under 35 U.S.C. § 371 of International Application No. PCT/EP2015/062303, filed Jun. 3, 2015, which claims priority to United Kingdom Patent Application No. 1409889.1, filed Jun. 4, 2014. The disclosures set forth in the referenced applications are incorporated herein by reference in their entireties.

FIELD OF THE INVENTION

This invention relates to antenna azimuth adjustment, and, more particularly, to the fine-tuning of antenna azimuth values based on data collected from mobile users.

BACKGROUND TO THE INVENTION

Radio planning parameters used by network operators to install base stations are often based on information derived from radio propagation models which simulate coverage and capacity within the desired geographical space of service of the base station. For example, calibrated pathloss models can predict the EIRP (equivalent isotropically radiated power) in geographical space accurately. However, although the signal quality across a particular geographical area can be determined, the signal quality per user in time (e.g. during the course of a day or week) cannot be predicted. Therefore, since such models can only approximate radio conditions in an environment and traffic distribution in time and location, the radio planning parameters used by network operators to install base stations carry inherent inconsistencies and errors.

The coverage and capacity of a base station sector in its dominant geographical space of service is defined by the average signal to noise and interference ratio (SNR) levels encountered by the mobile devices of users served by the base station sector. Each mobile user establishes a discrete radio link with the sector base station, but all users are served by a finite amount of radio power in the 3-dimensional antenna radiation space. When users are located at the "cell-edge", a lack of power (caused by excessive pathloss) and/or high interference can result in the underperformance of signal to noise and interference ratio (SNR) levels encountered by selected radio links in a sector's service area. Underperforming radio links in a sector's service area result in low average signal to noise and interference ratio (SNR) levels delivered by the base station sector in its dominant geographical space of service, thereby resulting in an underperforming base station investment for the network.

An uneven user distribution split in the base station sector dominant geographical space of service (i.e. other than 50/50 about the central antenna sector radiation heading) can significantly impact the sector coverage and capacity performance (amongst other network key performance indicators (KPIs), since the overall radio channel quality (indicated by the average signal to noise and interference ratio (SNR) levels delivered to the mobile devices of users served) is reduced. Existing radio planning processes, which define and select the direction of the finite amount of radio power in the 3-dimensional antenna radiation space, can introduce inefficiencies due to simulation approximations, user mobile distribution and behaviours and implementation inaccuracies that impact base station performance in the network.

It is an aim of the present invention to mitigate at least some of the above mentioned drawbacks.

SUMMARY OF THE INVENTION

According to a first aspect of the invention, there is provided a method of determining the optimum radio planning parameter of an antenna azimuth heading, comprising receiving, by a control system, a first set of data indicative of network performance for mobile devices of users within a specified geographical area covered by an antenna sector having a first azimuth heading; determining, by the control system, a first set of average values of parameters indicative of network performance based on the first set of data; receiving, by the control system, a second set of data indicative of network performance for mobile users within the specified geographical covered by an antenna having a second azimuth heading, wherein the second azimuth heading is different from the first azimuth heading, determining, by the control system, a second set of average values of parameters indicative of network performance for the antenna sector having the second azimuth value based on the second set of data; comparing the first and second sets of average values of parameters indicative of network performance at the first and second azimuth headings for the antenna sector to determine the azimuth heading at which the network performance is optimized.

The present invention thereby allows for the dynamic adjustment of an antenna heading based on actual, rather than estimated, variations in user and traffic distribution over time in order to optimise radio resources and improve the overall network performance experienced by mobile devices serviced by the antenna.

Preferably, the method further comprises receiving, by a control system, a third set of data indicative of network performance for mobile users within a specified geographical sector for an antenna sector at a third azimuth heading, the geographical sector being served by an antenna; determining, by the control system, a third set of average values of parameters indicative of network performance for the antenna sector at the third azimuth heading based on the third set of data, comparing the average values of the parameters indicative of network performance at the first and second and third azimuth heading for the antenna sector to determine the azimuth heading at which the network performance is optimized.

Optionally, the first azimuth heading is 0 degrees offset from the installed value, the second azimuth heading is −10 degrees offset from the installed heading and the third azimuth heading is +10 degrees offset from the installed azimuth heading. This helps to ensure there is little or no overlapping with neighbouring cell sectors.

Parameters indicative of network performance may comprise voice traffic, data traffic, throughput rates, received signal strength, channel quality, signal to noise and interference ratio and block error rate.

The method preferably further comprises adjusting the antenna heading to the azimuth heading at which the network performance is optimised.

Preferably, a data set indicative of network performance from mobile users is received when the antenna sector is at the azimuth value at a specified time and/or for a specified period.

Preferably, the sets of data are used by the control system to construct an adjustment pattern of optimal azimuth headings over time, and the method may further comprise generating, by the control system, instructions to adjust the azimuth heading, at a specified time and/or for a specified time period, to the first, second or third azimuth heading based on the adjustment pattern.

Optionally, the specified time period is based on at least one of an average number of mobile users in the geographical sector and the extent of use of the network by the mobile devices in the geographical sector.

Preferably, a data set indicative of network performance is received from a sample of all of the mobile usage within the geographical area serviced by the antenna sector or group of antenna sectors at a predetermined time and/or for a predetermined period.

According to a second aspect the invention, there is provided a machine readable medium storing executable instructions that when executed by a data processing system cause the system to perform the method of the invention.

According to a third aspect of the invention, there is provided a system for fine tuning the azimuth heading of an antenna sector, comprising a control system arranged to:

receive, from mobile users within a geographical area serviced by the antenna sector, a first set of data indicative of network performance, and determine a first set of average values of parameters indicative of network performance based on the first set of data, determine a first set of average values of parameters indicative of network performance based on the first set of data; receive a second set of data indicative of network performance for mobile users within the specified geographical sector for the antenna having a second azimuth value, wherein the second azimuth value is different from the first azimuth value, the geographical sector being served by the antenna sector, determine a second set of average values of parameters indicative of network performance for the antenna sector having the second azimuth value based on the second set of data; compare the first and second sets of average values of parameters indicative of network performance at the first and second azimuth values for the antenna sector to determine the azimuth value at which the network performance is optimized, and generate adjustment instructions, based on the determined azimuth value at which the network performance is optimized.

Optionally such a control system comprises a Self Organizing Network platform.

Preferably, the system further comprises adjustment apparatus controllable by the control system, wherein the adjustment apparatus is configured to adjust the azimuth of the antenna sector based on the adjustment instructions generated by the control system.

Optionally, such an adjustment apparatus comprises a multi-beam antenna system.

According to a fourth aspect of the invention, there is provided a method of determining an antenna azimuth heading value, comprising receiving, by a control system, first data relating to a parameter indicative of network performance for mobile devices of users within a specified geographical area covered by an antenna sector having a first azimuth heading value, and second data relating to the parameter indicative of network performance for mobile devices of users within a specified geographical area covered by an antenna sector having a second azimuth heading; comparing, by the control system, the first data and second data to determine which of the first data or second data meet predetermined criteria; selecting, by the control system, an antenna azimuth heading value from the first azimuth heading and the second azimuth heading value based on which of the first data or second data meet predetermined criteria.

Preferably, at least one of the first azimuth heading value and second azimuth heading value is different from an initial installation azimuth heading value of the antenna.

The method preferably further comprises receiving third data relating to the parameter indicative of network performance for mobile devices of users within a specified geographical area covered by an antenna sector having a third azimuth heading, comparing the first, second and third data to determine which of the first, second or third data meet predetermined criteria and selecting, by the control system, an antenna azimuth heading value from the first azimuth heading, the second azimuth heading value and the third azimuth heading based on which of the first, second or third data meet predetermined criteria.

Optionally, the first data is received by the control system during a first time period, the second data is received during a second time period and the third data set is received during a third time period, and wherein the method further optionally comprises generating, by the control system, an instruction to adjust or maintain the antenna azimuth heading value and to set the azimuth heading value in accordance with the instruction for a fourth time period. Preferably, the first time period immediately precedes the second time period, the second time period directly precedes the third time period and the third time period directly precedes the fourth time period.

The method optionally further comprising outputting, by the control system, the instructions to adjust or maintain the antenna azimuth heading value to an antenna alignment apparatus. Preferably the method occurs in real-time or near real-time.

Preferably, the first, second and third data received each comprise data relating to usage of a sample of all mobile devices of users located within the specified geographical area covered by the antenna sector having the first, second and third azimuth heading values respectively.

According to a fifth aspect of the invention, there is provided a non-transitory machine readable medium storing executable instructions that when executed by a data processing system cause the system to perform a method according to the fourth aspect.

According to a sixth aspect of the invention, there is provided a system for determining an antenna azimuth heading value, comprising an antenna control system arranged to receive first data relating to a parameter indicative of network performance for mobile devices of users within a specified geographical area covered by an antenna sector having a first azimuth heading value, and second data relating to the parameter indicative of network performance for mobile devices of users within a specified geographical area covered by an antenna sector having a second azimuth heading; compare the first data and second data to determine which of the first data or second data meet predetermined criteria, wherein the predetermined criteria is based on the parameter indicative of network performance; select an antenna azimuth heading value from the first azimuth heading and the second azimuth heading value based on which of the first data or second data meet predetermined criteria.

BRIEF DESCRIPTION OF THE DRAWINGS

A preferred embodiment of the invention will be described with reference to the appended drawings in which:

FIG. 8 is a table showing data collected during a single day for an exemplary dynamic antenna azimuth system;

DETAILED DESCRIPTION

Various studies have shown that the capacity ($C_{Mbps}$) achieved in any service area is equal to the available bandwidth ($B_{MHz}$) multiplied by the system's spectral efficiency ($E_{MB/s/MHz}$) multiplied by the number of cell/sectors covering the service area ($N_{Cell}^-$). The capacity ($C_{Mbps}$) that an entire network ($N_{cells}$=All), a base station ($N_{cells}$=3) or a cell/sector ($N_{cells}$=1) can deliver defines the performance of a network in its geographical space of service:

$$C_{Mbps} = B_{MHz} \times E\frac{Mbps}{MHz} \times N_{cells}$$

A variable that can increase network capacity is the improvement of the users' radio conditions (or radio link spectrum efficiency) in their actual radio environment. According to the Shannon-Hartley theorem, the relationship between spectrum efficiency and signal quality (SNR) is as follows:

$$C_{Mbps} = B_{MHz} \times E\frac{Mbps}{MHz},$$
$$C_{Mbps} = B_{MHz} \times \log_2(1 + SNR) \therefore$$
$$E\frac{Mbps}{MHz} = \log_2(1 + SNR)$$

Figure 1:
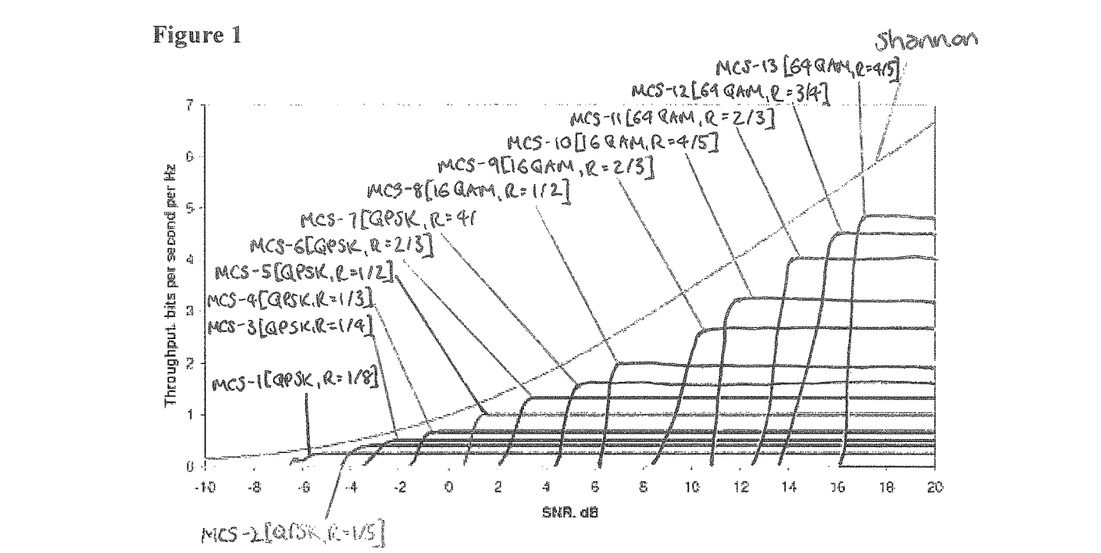
FIG. 1 illustrates generally how throughput varies with signal-to-noise ratio.

FIG. 1 shows how capacity varies with signal quality for dynamic modulation and coding of advanced systems (E-UTRA, the access mode of 3GPP's LTE equivalent).

Whilst broadband technology is able to share the finite power resource (by primarily employing power control in favour of the "weak" radio links), the priority is to satisfy pre-defined radio resource management targets (i.e. BLER (block error rate) of 10%). Accordingly, the system will "steal" power from any mobile device with better radio conditions in order to maintain an average quality of experience for all users served.

It is further known that NodeB schedulers (base station management) decide which mobile devices to transmit to based on their instantaneous radio conditions at that moment in time. Such system-level power control management uses the SNR perceived by the mobile devices (e.g. the NodeB scheduler transmits to a mobile device when the device's power control dynamic range is over 70 dB and external wideband interference is at a maximum values for the particular location of the device). For users whose instantaneous radio condition do not meet these requirements, the power control management of the NodeB scheduler will strive to satisfy the 10% block error rate target for mobile users serviced by the NodeB, sharing power between them accordingly.

Figure 2:
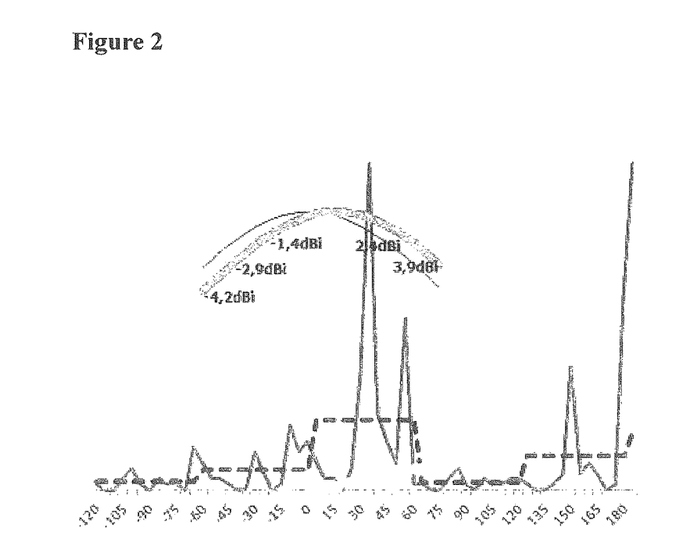
FIG. 2 shows how average gain varies with user distribution in the azimuth plane for an azimuth heading at +10 degree offset from its initially planned and installed azimuth heading.

FIG. 2 shows a typical radiation pattern of a UMTS antenna (such as Powerwave 5720.1). It can be seen that, in a range of 60° (indicatively 0° to 60° with respect to the main bore) there is a high concentration of users (spiked line) that are located clockwise of the antennas' maximum gain (dotted line). This demonstrates the importance of correct azimuth setting in terms of gain variation in the 120° sector coverage area in the azimuth plane. As discussed above, existing practices concerning radio planning practice carry inherent inefficiencies since such practices do not account for actual user distribution in the azimuth plane, which results in a degraded system capacity when the radio resource is misdirected by the antenna despite such practices being aided by the ability to, for example, not block calls.

Depending on the actual SNR the mobile devices are reporting to the NodeB/base station, it is generally the case that the system assigns the appropriate modulation and coding scheme to meet the 10% BLER target. Therefore, assuming that the sectors' SNR is, on average, bad (e.g. the average Ec/Io (signal to noise and interference ratio)) less than −20 dB), fine tuning the azimuth heading dynamically may not significantly increase the capacity performance of the sector. However, when the SNR is, on average, good, fine tuning the azimuth heading can increase the sectors' capacity performance by an order of a magnitude, which can reach as much as even +50% in gain for a relatively small (a couple of dB's) improvement in SNR, depending on actual Ec/Io values.

Therefore, if the sector's radio resource is assumed to offer its 100% capacity in the planned and installed antenna heading, by azimuth fine-tuning the existing radio plan, the SNR and capacity will increase. The actual capacity gain per dB SNR improvement is dependent on the average Ec/Io (signal to noise and interference ratio) and CQI levels the mobile devices served are encountering in the sectors' geographical space of service.

Figure 3:
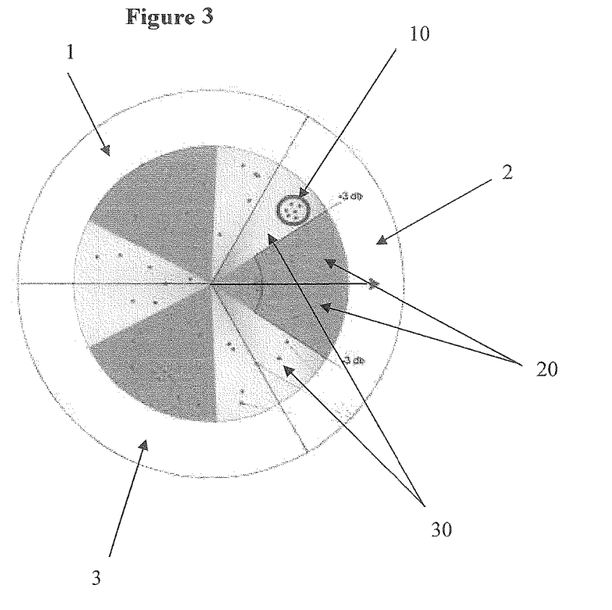
FIG. 3 shows a schematic diagram in plan view of uneven mobile user distribution in the azimuth plane.

FIG. 3 shows an example of user distribution across three network sectors 1, 2, 3. A dense area 10 of mobile users is shown. Such an area may occur during a period of time, for example a working day, due to the existence of a hotspot. Accordingly, network sector 1 is required to serve the hotspot (a confined area that gathers significant amount of users that are generating traffic). During the time period the hotspot is active, over 51% of the established radio links (i.e. the links between the base station and the users located within sector 1) are located counterclockwise of the maximum antenna gain in the azimuth plane. The maximum antenna gain is at the central heading of the antenna sector—i.e. at 0 degree offset to the planned and installed antenna heading.

As illustrated in FIG. 3, antenna sectors do not always serve users evenly located within the sector i.e. the user distribution is not split 50/50 either side of the maximum antenna gain. Such an uneven distribution, where mobile use is weighted to one side of the antenna sector at the planned and installed azimuth heading, results in inefficiencies such that the antenna sector is underperforming for the majority of users within the sector.

Figure 12:
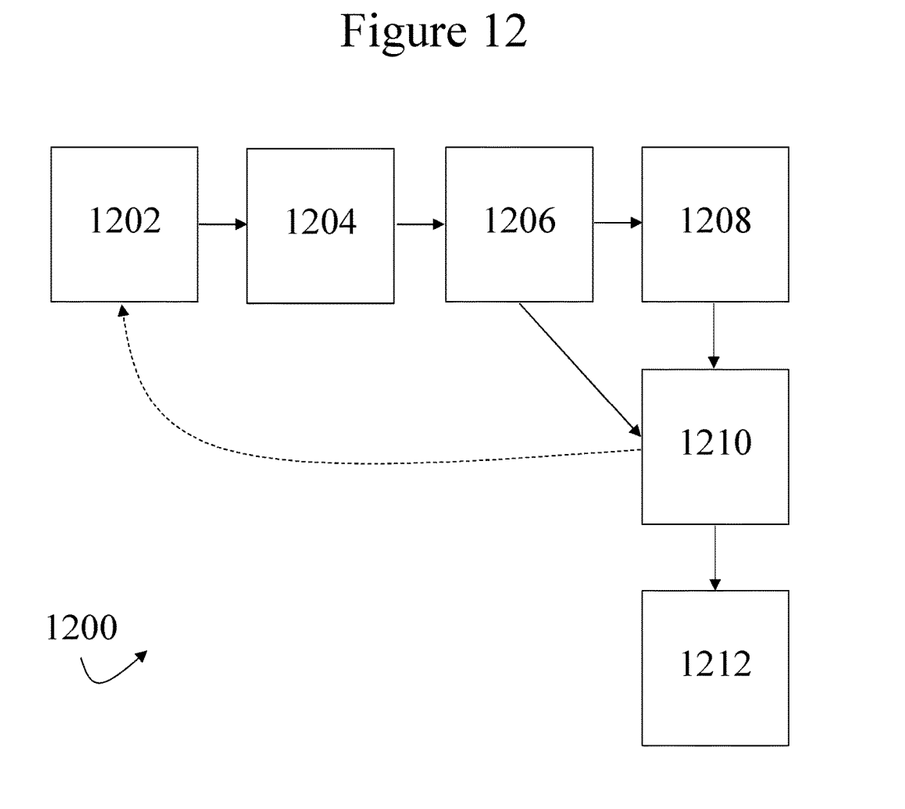
FIG. 12 illustrates a flow chart representative of a method of determining an antenna azimuth heading value according to at least one embodiment of the present disclosure.

To determine the optimum antenna azimuth heading within an antenna sector geographical area, data is collected by a control system (e.g. a Self Organizing Network platform) via a base station or nodeB for a specified number of azimuth heading offsets with respect to the initially planned and installed heading, at predetermined time and/or for predetermined time periods (for example, via method 1200). The control system is capable of receiving (step 1202) and processing data from the mobile devices, and determining (step 1206), by analyzing the received data (step 1204), the optimum offset for the antenna heading over a specified period. It can also generate a mobility pattern for the antenna azimuth based on the optimum offset results (step 1208) and generate a series of instructions which can be output to apparatus to adjust the azimuth heading (step 1210). The control system may be located at or near the base station or remote from the base station.

It is assumed that the average user distribution pattern throughout a week is repeated (i.e. the user distribution pattern for each week the same). As such, data collected at different offsets at the same times within the week (for example) can be compared. It is similarly assumed that the average user distribution variation is similar (i.e. is repeated) for holiday periods (e.g. Christmas/New Year and Easter). An antenna offset pattern for a particular user distribution pattern of a time period (e.g. Monday-Sunday weeks) is constructed by comparing data collected at the same time within the period at different offsets. Thus, to compare equivalent data to construct an azimuth sector heading pattern, it should be ensured that the data is collected within periods exhibiting the same average user distribution pattern. It will be appreciated that the different average user distribution patterns will depend upon the specific application. For example, in some embodiments, it may be assumed that Mondays exhibit the same average user distribution pattern as Tuesdays. In this case, data collected hourly at −10 degree offset on a Monday can be compared with data collected hourly at a +10 degree offset on Tuesdays in order to construct an antenna sector heading pattern for a weekday.

In an exemplary embodiment of the invention (for example, see method 1200 of Figure th, data is directly collected from the mobile devices of users when an antenna azimuth heading is at a 0 degree offset for a seven day week (Monday to Sunday) period, herein denoted as week 1 (step 1202). The collection/recordal of average key performance indicator data (as discussed below) for all users served by the antenna sector occurs hourly. Accordingly, every hour of every day during week 1, a base system controller records data indicative of the antenna sector performance. One or more KPIs to be collected may be selected out of a list of KPIs comprising, for example, the received signal strength, channel quality (i.e. drop call rate, access failure rate), signal to noise and interference ratio (i.e. CQI, Ec/Io, Eb/Io) and voice and data traffic consumed (Erlangs, Mb). Depending on the KPI used, average values of the KPI data received during the data collection periods can be calculated.

The control system analyses the data (step 1204) to determine values of the key performance indicators and therefore provide a (relative) indication of how network performance varies hour to hour, and, extrapolating the data further, from day to night, from weekday to weekend, etc. (step 1208).

For the following week (Monday to Sunday) week 2, the antenna sector heading is adjusted such that it is +10 degrees offset from the initial planned and installed heading (step 1210). Key performance indicator data is collected in a similar manner as for week 1 to determine an indication of network performance variation at the +10 degree offset during the week.

Week 1 data is compared with week 2 data to determine the differences in network performance when the antenna heading is at 9 degree offset and +10 degree offset over the course of a week (step 1212). For example, the data collected on Monday at 9.00 am in week 1 (0 degree offset) is compared with the data collected on Monday at 9.00 am in week 2 (+10 degree offset). The data collected on Sunday at 11.00 am in week 1 (0 degree offset) is compared with the data collected on Saturday at 11.00 am in week 2 (+10 degree offset). Such a comparison facilitates the identification, at a particular time or for a particular time period, of the antenna sector heading offset that results in, overall, more favourable network performance.

For week 3 (Monday to Sunday), the antenna heading is adjusted to −10 degree offset. Data indicative of network performance is similarly collected as for weeks 1 and 2, and compared with weeks 1 and 2 to determine the antenna sector azimuth heading of either −10, 0, and +10 degree offset that result in the most favourable network performance at specified times or within specified time periods throughout a Monday to Sunday week.

From a comparison of the data collected during the sample period (comprising weeks 1, 2, and 3), an optimized antenna sector azimuth adjustment pattern for a Monday to Sunday week is constructed to provide instructions to the control system, which communicates with an antenna adjustment mechanism, to adjust the antenna during the course of a Monday to Sunday week (in weeks 4 to week N) so as to optimize network performance for the majority of network users (step 1210). Methods of accurate adjustment of an antenna are discussed in the applicant's prior published patent applications WO2013171291 and WO2013011002, the contents of which are hereby incorporated by reference where permitted. However, other methods, apparatus and antennas to accurately adjust azimuth radiation may also be used.

In a heavily populated urban centre, e.g. a city, where there are many mobile users, on average, serviced by a particular network sector, the distribution of mobile users across the geographical area serviced by an antenna sector may vary rapidly, although the actual degree of variation may not be significant due to the high numbers of mobile users in the sector. In this case, it may be appropriate to collected KPI data regularly (e.g. per minute) over a short time period (e.g. daily).

In a sparsely populated rural area, there may be less mobile users, on average, serviced by a particular network sector. The distribution of mobile users across the geographical area serviced by an antenna sector may vary slowly, although the actual degree of variation may be significant due to the relatively low numbers of mobile users in the sector. In this case, it may be appropriate to collect KPI data less regularly (e.g. per hour or day) over a longer time period (e.g. weekly).

In another embodiment, a more 'real-time' approach is adopted, whereby data is collected at each offset during (for example) the first three minutes of each quarter hour (e.g., +10 deg for minute 1, 0 deg for minute 2 and −10 deg for minute 3) (step 1202). The frequency of the data collection/recordal during the 1 minute intervals may vary according to the specific circumstances. The control system calculates the optimum offset based on the collected data (steps 1204-1206) and instructs adjustment apparatus to adjust the azimuth of the antenna to the optimum offset at the end of the first three minutes (step 1210). The antenna remains at this offset for the next 12 minutes. Data is collected again for the next three minutes of the following quarter hour (step 1202) and the process is repeated (steps 1204, 1206, 1210). For a real-time approach, no adjustment pattern is construed by the control system. The sampling intervals and the adjustment interval are flexible and will be set depending on the specific antenna system, location, extent of mobile device mobility, processing resources of the control system, etc.

An example of the determination of an optimal antenna azimuth heading is discussed with reference to actual data collected by a control system for an antenna installation which is directed generally at a residential area. In this example, the KPI used is number of voice calls, also known as loading of a cell/antenna. In this example, voice call data samples were collected during 15 minute intervals. The data collection pattern is repeated every 45 minutes (discussed further below with reference to FIG. 8).

Figure 4:
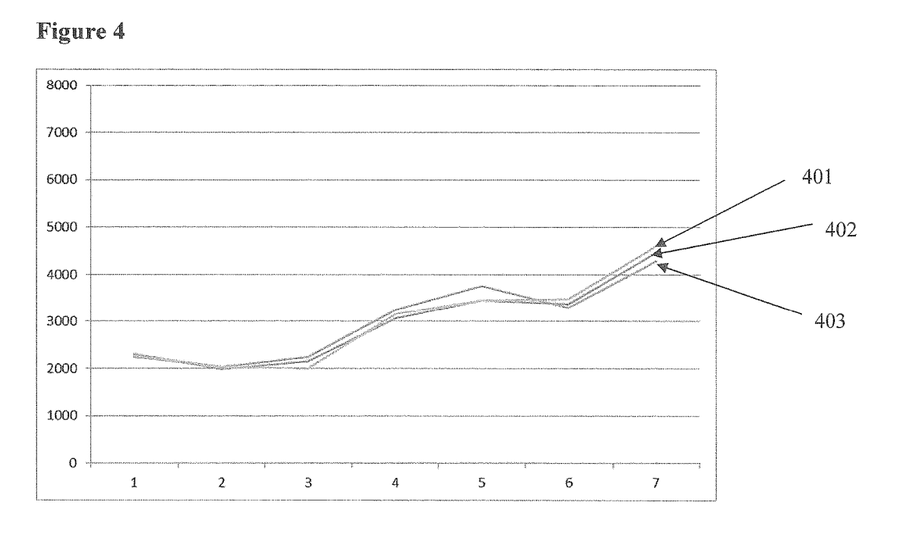
FIG. 4 is a graph depicting the variation in the number of voice calls between different quarter-hours periods over seven consecutive days for a static antenna system.
Figure 5:
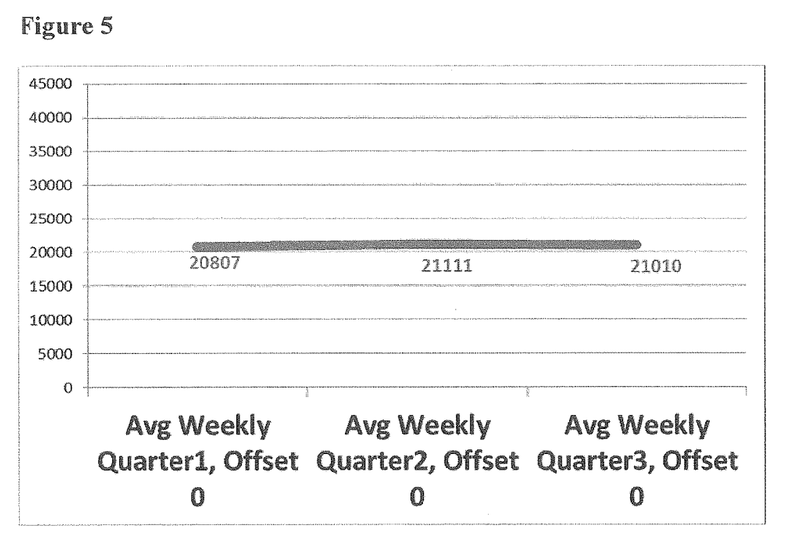
FIG. 5 is a graph showing the variation in averaged number of voice calls between different quarter-hour periods for a static antenna system.

FIGS. 4 and 5 relate to data collected when the antenna is static—i.e. there is no azimuth adjustment. FIG. 4 shows how the number of voice calls (y-axis) varies between different quarter hour periods over consecutive days (Monday-Sunday on the x-axis) when the antenna azimuth is positioned at 0 degrees offset (i.e. the initial position). The number of voice calls recorded during each of the third quarter-hour periods is averaged per day and is shown by line 401. Line 402 similarly shows the variation in the day-averaged number of voice calls collected during the first quarter hour period of each 45 minute cycle during a day. Line 403 similarly shows how the average number of voice calls per day collected during the second of each quarter hour period of each 45 cycle varies of the week.

FIG. 5, related to FIG. 4, shows (for a static antenna system) the weekly averaged number of voice calls based on samples collected during each of the first 15 minutes periods of the 45 minute cycles (20807 voice calls), the averaged number of voice calls based on samples collected during each of the second 15 minute periods of the 45 minute cycles (21111 voice calls) and the average number of voice calls of a sample collected during each of the third 15 minute periods of the 45 minute cycles (21010 voice calls). FIG. 5 therefore shows that (regardless of any variation in total number of voice calls by day) the total number of voice calls collected during different 15 minute intervals does not vary significantly.

Figure 6:
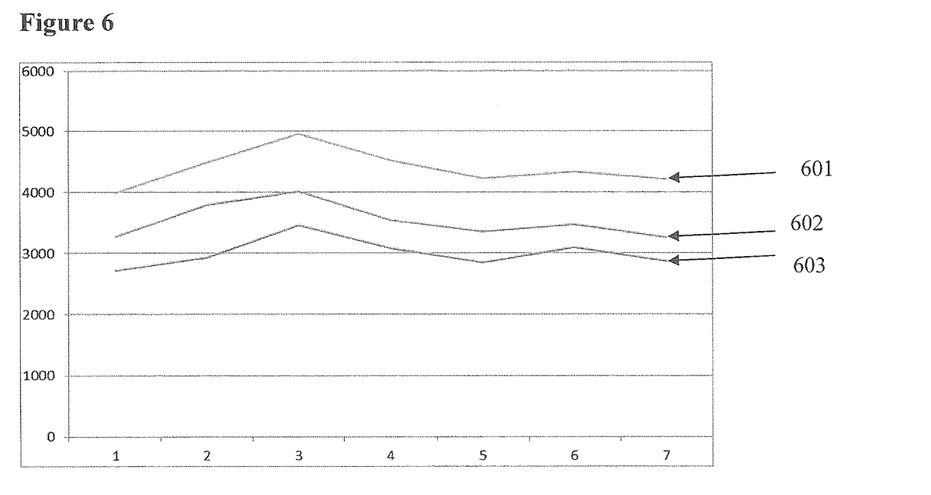
FIG. 6 is a graph showing the variation in the number of voice calls between different quarter-hours periods over seven consecutive days for an exemplary dynamic antenna azimuth system.

FIG. 6 shows the variation in the day-averaged number of voice calls over seven consecutive days collected during each of the second quarter hour periods (when the the specific antenna system, location, extent of mobile device mobility, processing resources of the control system, etc.

An example of the determination of an optimal antenna azimuth heading is discussed with reference to actual data collected by a control system for an antenna installation which is directed generally at a residential area. In this example, the KPI used is number of voice calls, also known as loading of a cell/antenna. In this example, voice call data samples were collected during 15 minute intervals. The data collection pattern is repeated every 45 minutes (discussed further below with reference to FIG. 8).

FIGS. 4 and 5 relate to data collected when the antenna is static—i.e. there is no azimuth adjustment. FIG. 4 shows how the number of voice calls (y-axis) varies between different quarter hour periods over consecutive days (Monday-Sunday on the x-axis) when the antenna azimuth is positioned at 0 degrees offset (i.e. the initial position). The total number of voice calls recorded during each of the third quarter-hour periods is shown by line 401. Line 402 similarly shows the variation in the number of voice calls collected during the first quarter hour period of each 45 minute cycle during a day. Line 403 similarly shows how the number of voice calls per day collected during the second of each quarter hour period of each 45 cycle varies over the week.

FIG. 5, related to FIG. 4, shows (for a static antenna system) the average weekly number of voice calls based on samples collected during each of the first 15 minutes periods of the 45 minute cycles (20807 voice calls), the number of voice calls based on samples collected during each of the second 15 minute periods of the 45 minute cycles (21111 voice calls) and the number of voice calls of a sample collected during each of the third 15 minute periods of the 45 minute cycles (21010 voice calls). FIG. 5 therefore shows that (regardless of any variation in total number of voice calls by day) the total number of voice calls collected during different 15 minute intervals does not vary significantly.

Figure 7:
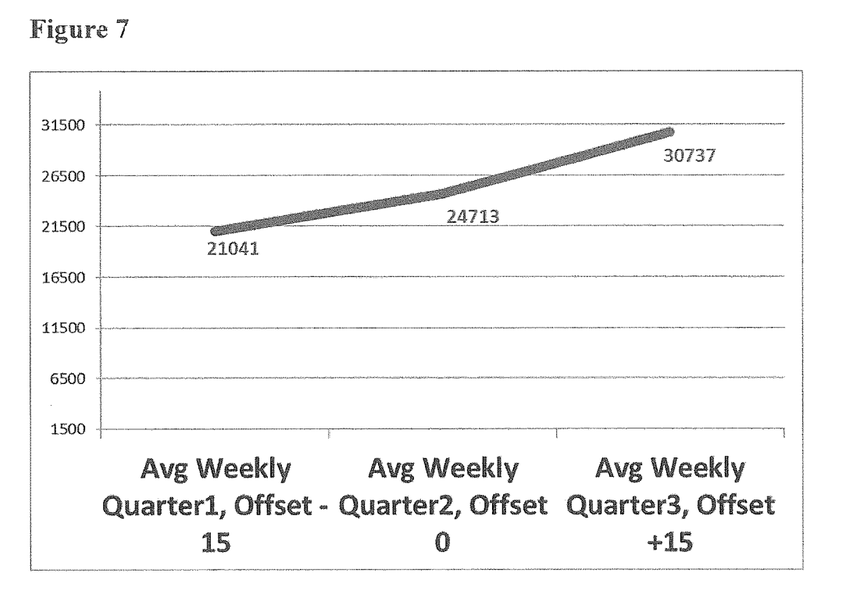
FIG. 7 is a graph showing the variation in averaged number of voice calls between different quarter-hour periods for a dynamic antenna azimuth system.

FIG. 6 shows the variation in the number of voice calls over seven consecutive days collected during each of the second quarter hour periods (when the azimuth value of azimuth value of the antenna is at 0 degrees offset (line 602)), the variation in the day-averaged number of voice calls recorded during each of the third quarter hour periods (when the azimuth value is +15 degrees offset (line 601) and the variation in the day-averaged number recorded during each of the first quarter hour periods (when the azimuth is at −15 degrees offset (line 603). The general trend is that the number of voice calls, for all offset values, peaks during day 3, but that at +15 degrees offset the largest number of voice calls are collected. This is supported by FIG. 7, which shows how the average number of voice calls varies for each of the first, second and third 15 minute intervals of each 45 minute collection cycle, where the antenna azimuth value is −15 degrees offset for the first 15 minute interval, 0 degrees offset for the second 15 minute interval and +15 degrees offset for the third 15 minute interval. The highest number of voice calls are collected during the third 15 minute interval when the antenna azimuth is set at +15 degrees offset.

Figure 9:
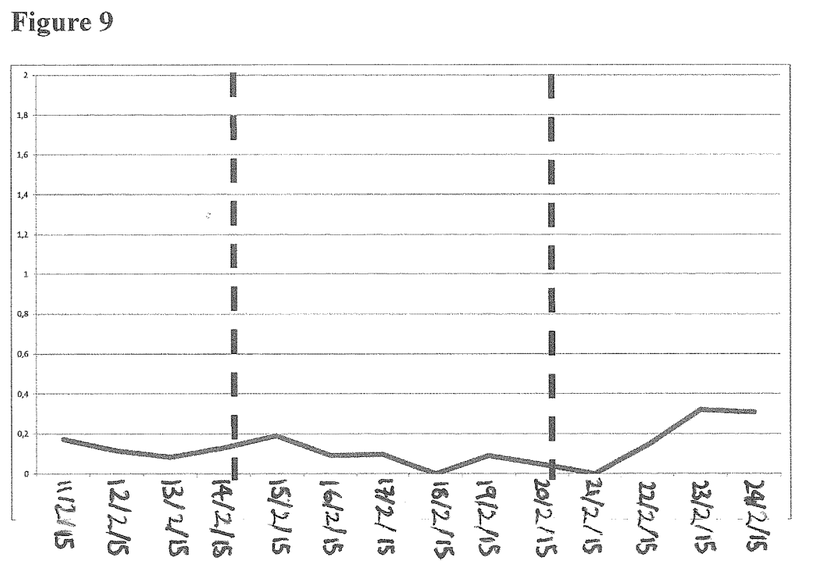
FIG. 9 is a graph showing variation in drop call rate over 14 consecutive days for an exemplary dynamic antenna azimuth system.

The table of FIG. 9 details the time periods, numbers of samples, actual azimuth value, and received signal code power (signal strength) data. Each sample denotes a single voice call. The 'max samples offset' column shows that the sum of the samples at 335 degrees is, for all but five of the 45 minute periods throughout day 1, higher than the sum of the samples at 305 degrees and 320 degrees. Therefore when the antenna azimuth direction is offset at +15 degrees to its initial installation value, more voice calls are serviced by the antenna. The furthest right hand column shows the percentage increase in the number of samples collected at 320 degrees (i.e. +15 degree offset) over the number taken at the initial installation azimuth heading of 305 degrees (i.e. 0 degree offset) for each 45 minute cycle. The value of 30.16% at the bottom of the furthest right hand column is the averaged percentage increase in voice calls collected at 335 degrees for day 1. Similar trends were shown by the results collected for each of days 2-6.

Figure 10:
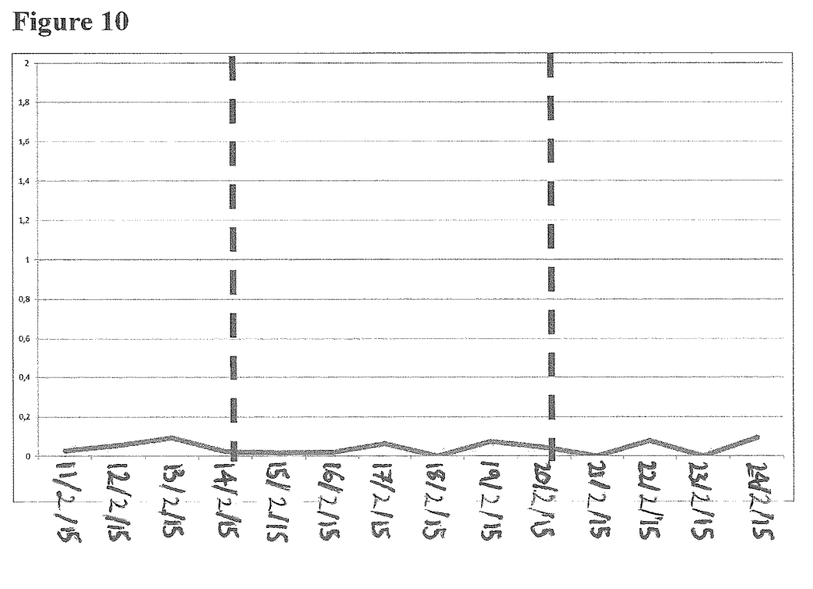
FIG. 10 is a graph showing variation in radio resource control fail over 14 consecutive days for an exemplary dynamic antenna azimuth system.
Figure 11:
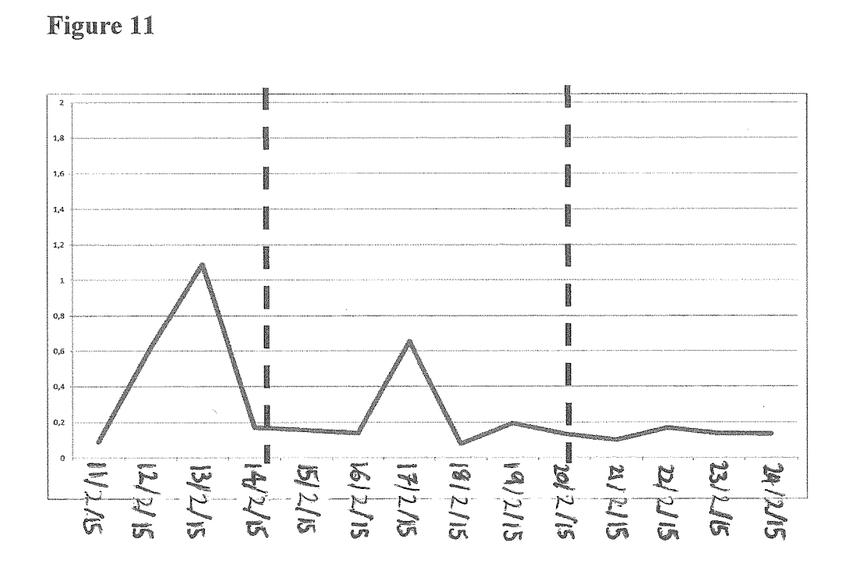
FIG. 11 is a graph showing variation in radio access bearer fail over 14 consecutive days for an exemplary dynamic antenna azimuth system.

FIGS. 10, 11 and 12 show how other KPIs are affected when the antenna azimuth is adjusted based on loading/offloading (voice call) data. FIG. 10 shows variation in drop call rate over a two week period. From 14/02 to 20/02 (i.e. within the central section of the graph) the azimuth was adjusted in accordance with the finding that a +15 degree offset provided more favourable network performance. FIG. 11 shows variation in radio resource control fail rate for the same period and for when the the antenna is at 0 degrees offset (line 602)), the variation in the number of voice calls recorded during each of the third quarter hour periods (when the azimuth value is +15 degrees offset (line 601) and the variation in the number recorded during each of the first quarter hour periods (when the azimuth is at −15 degrees offset (line 603). The general trend is that the number of voice calls, for all offset values, peaks during day 3, but that at +15 degrees offset the largest number of voice calls are collected. This is supported by FIG. 7, which shows how the average number of voice calls varies for each of the first, second and third 15 minute intervals of each 45 minute collection cycle, where the antenna azimuth value is −15 degrees offset for the first 15 minute interval, 0 degrees offset for the second 15 minute interval and +15 degrees offset for the third 15 minute interval. The highest number of voice calls are collected during the third 15 minute interval when the antenna azimuth is set at +15 degrees offset.

The table of FIG. 9 details the time periods, numbers of samples, actual azimuth value, and received signal code power (signal strength) data. Each sample denotes a single voice call. The 'max samples offset' column shows that the sum of the samples at 335 degrees is, for all but five of the 45 minute periods throughout day 1, higher than the sum of the samples at 305 degrees and 320 degrees. Therefore when the antenna azimuth direction is offset at +15 degrees to its initial installation value, more voice calls are serviced by the antenna. The furthest right hand column shows the percentage increase in the number of samples collected at 320 degrees (i.e. +15 degree offset) over the number taken at the initial installation azimuth heading of 305 degrees (i.e. 0 degree offset) for each 45 minute cycle. The value of 30.16% at the bottom of the furthest right hand column is the averaged percentage increase in voice calls collected if the antenna azimuth heading was set at 335 degrees for the time periods as shown. Similar trends were shown by the results collected for each of days 2-6.

FIGS. 10, 11 and 12 show how other KPIs are affected when the antenna azimuth is adjusted based on loading/offloading (voice call) data. FIG. 10 shows variation in drop call rate over a two week period. From 14/02 to 20/02 (i.e. within the central section of the graph) the azimuth was adjusted in accordance with the finding that a +15 degree offset provided more favourable network performance. FIG. 11 shows variation in radio resource control fail rate for the same period and for when the azimuth is adjusted as per FIG. 10. FIG. 12 shows variation in radio access bearer fail rate also for the same period and for when the azimuth is adjusted. As can been seen, adjustment of the azimuth has no significant bearing on these KPIs.

The data described with reference to FIGS. 4-12 exemplarily shows how a determination can be made, based on one of a number of different possible KPIs, regarding an antenna azimuth offset that provides optimised network performance.

The KPIs such as RSCP (received signal strength), CQI (channel quality indicator), Ec/Io (signal to noise and interference ratio) and BLER (block error rate) that are optimized by the dynamic antenna azimuth fine-tuning method described herein are indicative of the total performance of the network as perceived by the mobile network users and may comprise other KPIs related to user experience (such as throughput, call success rate and drop call rate, amongst others). These indicators may be used alone or in combination to determine the actual network performance. Other indictors may also be used alone or combined with those listed. Other azimuth offset heading values may also tested.

The actual time periods within which data is collected, and the number of mobile users within the sector that comprise the sample, as well as the number of time data from a particular mobile user within the sample period is collected, are dependent upon the amount of users served by the antenna sector and user mobility (i.e. the extent to which mobile users move around within and in/out of the sector within a specified period of time), amongst other factors.

Optimisation of network performance means that, at least, the voice and/or data traffic will increase while maintaining at least the same or better quality of service for the mobile users served. It is expected that the received signal strength for the majority of mobile users will be increased. This may result, if improved on average, in the decrease of power/received signal strength for some (a minority) of mobile users, and an increase in the power/received signal strength for a majority of mobile users.

The azimuth offset heading value chosen may vary, and may depend of the number of sectors within a specified area. However, the chosen offset should not, preferably, result in more than a variation of 20% of the −3 dB antenna radiation in the azimuth plane. This means that for a 60 degree −3 dB horizontal beamwidth antenna radiation, the azimuth offset heading should not exceed 10 to 15 degrees, and for a 30 degree −3 dB horizontal beamwidth antenna radiation, the azimuth offset heading should not exceed 5 to 10 degrees. This is recommended in order to maintain the same antenna sector geographical space of service, so that the collected KPIs from the mobile devices best served by the antenna sector to be compared are equivalent. The same is valid for any antenna system and type used such as MIMO, multi-beam, smart and the like, but for these cases the −3 dB horizontal beamwidth refers to the equivalent total antenna radiation (all beams, outside beams).

As will be appreciated, the present invention provides a method to increase the performance of the antenna sector in time without altering the geographical area served by the antenna sector or the bandwidth. Accordingly, in order to increase channel quality and overall capacity, improve bandwidth consumption/throughput and so optimise performance, the following provides a method for fine-tuning the antenna sector azimuth heading based on actual data from at least a sample of mobile users within the network.

The invention claimed is:

1. A method of determining an antenna azimuth heading value and adjusting a position of an antenna, comprising:
receiving, by a control system, first data relating to a parameter indicative of network performance for mobile devices of users within a specified geographical area covered by an antenna sector having a first azimuth heading value, and a second data relating to the parameter indicative of network performance for mobile devices of users within a specified geographical area covered by an antenna sector having a second azimuth heading value;

comparing, by the control system, the first data and second data to determine which of the first data or second data meet predetermined criteria, wherein the predetermined criteria is based on the parameter indicative of network performance;

selecting, by the control system, an antenna azimuth heading value from the first azimuth heading value and the second azimuth heading value based on which of the first data or second data meet predetermined criteria; and adjusting, or having adjusted, an antenna to the selected antenna azimuth heading value.

2. The method of claim 1, wherein at least one of the first azimuth heading value and second azimuth heading value is offset from an initial installation azimuth heading value of the antenna, and wherein the predetermined criteria indicates if the first azimuth heading value or the second azimuth heading value results in a desired network performance.

3. The method of claim 1, further comprising receiving third data relating to the parameter indicative of network performance for mobile devices of users within a specified geographical area covered by an antenna sector having a third azimuth heading value and wherein the step of comparing comprises comparing the first, second and third data to determine which of the first, second or third data meet predetermined criteria;

selecting, by the control system, an antenna azimuth heading value from the first azimuth heading value, the second azimuth heading value and the third azimuth heading value based on which of the first, second, or third data meet predetermined criteria.

4. The method of claim 3, wherein the first, second and third data received each comprise data relating to usage of a sample of all mobile devices of users located within the specified geographical area covered by the antenna sector having the first, second and third azimuth heading values respectively.

5. The method according to claim 1, wherein the first data is received by the control system during a first time period, the second data is received during a second time period and the third data is received during a third time period, and wherein the method further comprises generating, by the control system, instructions to adjust or maintain the antenna azimuth heading value according to the selected antenna azimuth heading value for a fourth time period.

6. The method of claim 1, wherein the step of adjusting, or having adjusted, an antenna to the selected antenna azimuth heading value further comprises:

generating, by the control system, instructions to adjust or maintain the antenna azimuth heading value according to the selected antenna azimuth heading value; and outputting, by the control system, the instructions to adjust or maintain the antenna azimuth heading value to an antenna alignment apparatus.

7. The method according to claim 1, wherein the method occurs in real-time or near real-time.

8. The method of claim 1, wherein the parameter indicative of network performance is selected from one of voice and data traffic, received signal strength, channel quality, signal to noise and interference ratio and block error rate.

9. A non-transitory machine readable medium storing executable instructions that when executed by a data processing system cause the system to perform a method according to claim 1.

10. A method of determining an optimum radio planning parameter of an antenna azimuth heading and adjusting a position of an antenna, comprising receiving, by a control system, a first set of data indicative of network performance for mobile devices of users within a specified geographical sector covered by an antenna sector having a first azimuth heading;

determining, by the control system, a second set of data indicative of network performance for mobile users within the specified geographical sector covered by an antenna having a second azimuth heading, wherein the second azimuth heading is different from the first azimuth heading;

determining, by the control system, a second set of average values of parameters indicative of network performance for the antenna sector having the second azimuth heading based on the second set of data;

comparing the first and second sets of average values of parameters indicative of network performance at the first and second azimuth headings for the antenna sector to determine the azimuth heading at which the network performance is optimized as between the first and second azimuth headings; and adjusting, or having adjusted, the antenna to the azimuth heading at which the network performance is optimized.

11. The method of claim 10, further comprising receiving, by a control system, a third set of data indicative of network performance for mobile users within a specified geographical sector for an antenna sector at a third azimuth heading, the geographical sector being served by an antenna;

determining, by the control system, a third set of average values of parameters indicative of network performance for the antenna sector at the third azimuth heading based on the third set of data;

comparing the average values of the parameters indicative of network performance at the first and second and third azimuth heading for the antenna sector to determine the azimuth heading at which the network performance is optimized as between the first, second, and third azimuth headings.

12. The method of claim 11, wherein the first azimuth heading is 0 degrees offset from the installed azimuth heading, the second azimuth heading is −10 degrees offset from the installed azimuth heading and the third azimuth heading is +10 degrees offset from the installed azimuth heading.

13. The method of claim 10, wherein parameters indicative of network performance comprise voice and data traffic, received signal strength, channel quality, signal to noise and interference ratio and block error rate.

14. The method of claim 10, wherein adjusting, or having adjusted, the antenna to the azimuth heading at which the network performance is optimized is performed by an antenna alignment apparatus in communication with the control system.

15. The method of claim 10, wherein a data set indicative of network performance from mobile users is received when the antenna sector is at the azimuth value at a specified time and/or for a specified period.

16. The method of claim 10, wherein the sets of data are used by the control system to adjust optimal azimuth headings in real-time.

17. The method of claim 10, wherein a data set indicative of network performance is received from a sample of all of the mobile users within the geographical area serviced by the antenna sector in real-time.

18. The method of claim 10, wherein the sets of data are used by the control system to construct an adjustment pattern of optimal azimuth headings over time.

19. The method of claim 18, further comprising generating, by the control system, instructions to adjust the azimuth heading, at a specified time and/or for a specified time period, to the first, second or third azimuth heading based on the adjustment pattern.

20. The method of claim 19, wherein the specified time period is based on at least one of an average number of mobile users in the geographical sector and the extent of use of the network by the mobile devices in the geographical sector.

21. The method of claim 10, wherein a data set indicative of network performance is received from a sample of all of the mobile users within the geographical area covered by the antenna sector at a predetermined time and/or for a predetermined period.

22. A non-transitory machine readable medium storing executable instructions that when executed by a data processing system cause the system to perform a method according to claim 10.

23. A system for fine tuning an azimuth heading of an antenna sector, comprising a control system arranged to:

receive, from mobile users within a geographical area serviced by the antenna sector, a first set of data indicative of network performance;

determine a first set of average values of parameters indicative of network performance based on the first set of data;

receive a second set of data indicative of network performance for mobile users within a specified geographical sector for the antenna having a second azimuth value, wherein the second azimuth value is different from the first azimuth value, the geographical sector being serviced by the antenna sector;

determine a second set of average values of parameters indicative of network performance for the antenna sector having the second azimuth value based on the second set of data;

compare the first and second sets of average values of parameters indicative of network performance at the first and second azimuth values for the antenna sector to determine the azimuth value at which the network performance is optimized as between the first and second azimuth values;

generate adjustment instructions, based on the determined azimuth value at which the network performance is optimized; and wherein the system further comprises an adjustment apparatus controllable by the control system, wherein the adjustment apparatus is configured to adjust the azimuth of the antenna sector based on the adjustment instructions generated by the control system.

* * * * *